United States Patent [19]

Caragliano et al.

[11] 3,904,824

[45] Sept. 9, 1975

[54] AUTOMATIC GAIN CONTROL FOR ENCODED DATA

[75] Inventors: Edward S. Caragliano; Howard H. Nick, both of Poughkeepsie, N.Y.

[73] Assignee: International Business Machines Corporation, Armonk, N.Y.

[22] Filed: Dec. 26, 1973

[21] Appl. No.: 428,467

[52] U.S. Cl. .................. 178/70 R; 328/164; 330/22

[51] Int. Cl.² ......................G01R 27/28; H03G 3/20; H04L 25/52

[58] Field of Search ............ 178/70 R, 70 TS, 71 R, 178/68, DIG. 26; 330/24, 22; 179/15 BL, 179/15 AD; 328/164; 340/147 SY; 333/18

[56] References Cited

UNITED STATES PATENTS

| | | | |
|---|---|---|---|
| 3,435,358 | 3/1969 | Rheinfelder | 178/70 R |
| 3,507,998 | 4/1970 | Moeller | 178/70 R |
| 3,579,123 | 5/1971 | Koga | 328/164 |
| 3,671,886 | 6/1972 | Fudemoto et al. | 178/70 R |

*Primary Examiner*—Thomas A. Robinson
*Attorney, Agent, or Firm*—Harold H. Sweeney, Jr.

[57] ABSTRACT

Automatic gain control is provided for a transmission system wherein the data is transmitted in frames including one or more flag bits. Circuitry is included for selecting one of the flag bits and further circuitry provides recirculation of the selected flag bit to provide a repetitive pulse output of the selected flag bit for the respective frame of data. The repetitive pulse output is filtered to obtain a substantially DC level which is indicative of the signal energy of the frame of data and which is applied to an amplifier to adjust the gain thereof so as to maintain the data at a predetermined energy level.

8 Claims, 4 Drawing Figures

AUTOMATIC GAIN CONTROL FOR ENCODED DATA

BACKGROUND OF THE INVENTION

1. Field of the Invention

The invention relates to automatic gain control circuitry for an amplifier and, more particularly, to automatic gain control circuitry for an amplifier in which the gain is derived from encoded data having a non-DC derivable characteristic.

2. Description of the Prior Art

In data transmissions, it is necessary to include amplifiers or repeaters spaced along the transmission line or loop to bring the signals up to strength for further transmission along the line. In order to alleviate the necessity of locating the amplifiers or repeaters at precise equal distances along the transmission line from one another, automatic gain control circuitry has been provided to adjust the gain of the amplifier in accordance with the strength of the signals received for amplification. This is usually accomplished by generating a DC signal level from the input data signals. These input data signals are usually bi-frequency or bi-phase signals which easily lend themselves to reduction to a DC level by filtering and integrating. The DC level is indicative of the signal strength and, accordingly, is used to adjust the gain of the amplifier.

U.S. Pat. No. 3,786,419 issued Jan. 15, 1974 shows a data transmission system loop in which the data is encoded using a non-DC derivable arrangement. The "1" signal is represented in this data encoding by a sinusoidal wave while a "0" is represented in the data as the absence of a sinusoidal signal. It will be appreciated that a string of 0's would provide a signal from which no DC signal could be derived.

SUMMARY OF THE INVENTION

It is the main object of the present invention to provide automatic gain control for non-DC derivable encoded data.

It is another object of the present invention to provide an automatic gain control arrangement which permits a system loop configuration to be flexible with regard to lengths of cable between repeaters when using a non-DC derivable encoding scheme.

It is a further object of the present invention to provide an automatic gain control system wherein the derived AGC inputs to a given amplifier are also utilized to provide indication that loop synchronization is established.

Briefly, the invention consists of an automatic gain control system for use in a transmission system which includes an amplifier wherein the data is transmitted in a non-DC derivable form in frames including one or more flag bits. The arrangement includes circuitry for selecting one of the flag bits and for re-circulating the selected flag bit to provide a repetitive pulse output of the selected flag bit for the respective frame of data. The repetitive pulse output is filtered to obtain a substantially DC level indicative of the signal energy of the frame of data which is applied to the amplifier to adjust the gain thereof so as to maintain the data at a predetermined energy level.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

Figure 1:
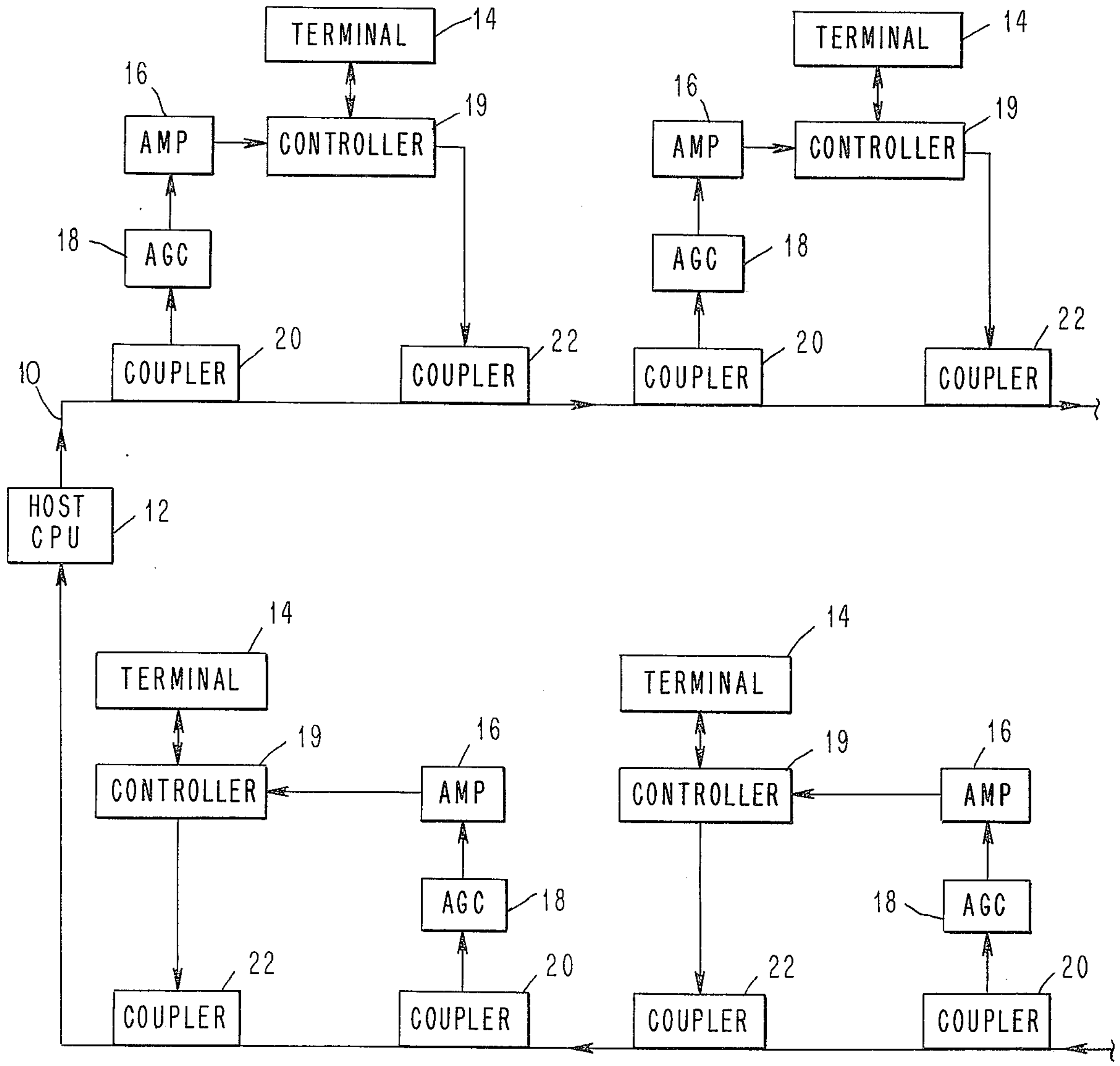
FIG. 1 is a schematic diagram showing a multi-terminal communication system which includes an automatic gain control arrangement for each amplifier in the system.

The control loop shown in FIG. 1 generally consists of a central processing unit or host 12 which sends information signals along the transmission line 10 to various terminals 14. These information signals as they propagate along the transmission line 10 are attenuated. Accordingly, it has been found necessary to bring the signals up to strength periodically by amplification. Since the transmission line 10 has generally uniform characteristics and affects the signals somewhat uniformly, the amplifiers 16, which are usually located at the terminals, are spaced equi-distant from one another. It is not convenient to place these amplifiers and terminals at a specific fixed distance with respect to one another. Accordingly, automatic gain control 18 is utilized at the input to the amplifiers 16 to control the gain thereof and bring the signal up to strength regardless of the strength of the incoming signal. It will be appreciated that the introduction of the automatic gain control system 18 to bias the gain of the amplifier 16 will allow considerable flexibility in the location of the amplifiers with respect to one another. Longer lengths of transmission line can be used between amplifiers and the lengths do not have to be the same.

Figure 2:
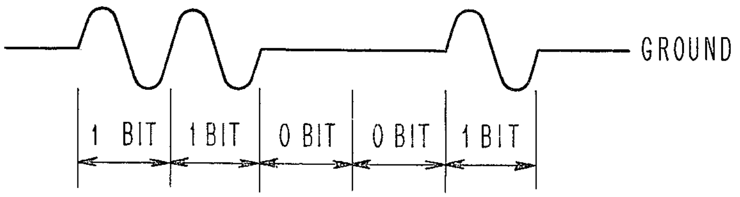
FIG. 2 is a waveform diagram illustrating a non-DC derivable code.

The controller 19 contains the receive and send section so that the terminal 14 can both receive the signals from the transmission line 10 or put new information thereon. The couplers 20 and 22 coupling the information signals from and to the transmission line, respectively, are any kind of coupling devices but preferably are the stripline devices known as directional couplers. The advantage of using directional couplers is that they have the capability of coupling signals from and to the transmission line without destroying the original signal. The encoded signals representing the data are shown in FIG. 2. One complete sinusoidal period represents a 1 bit of information and no waveform represents a 0 bit. This type of data encoding is unreliable for providing a usable DC value for automatic gain control. It can be seen that a long string of 0's has no derivable DC content.

To utilize the new AGC system 18, it is required that the data be transmitted along the transmission line in frames which have a flag bit or bits which define either the beginning or the end of each frame of data. To best illustrate the invention, we have chosen as flag bits three bits at the beginning of the frame represented by 0,1,1, respectively. The flag bits are shown as waveform 33 in FIG. 4. It is this flag that will be utilized in this invention to provide the DC levels for the automatic gain control. The data frame chosen contains 64 bits of data.

Figure 3:
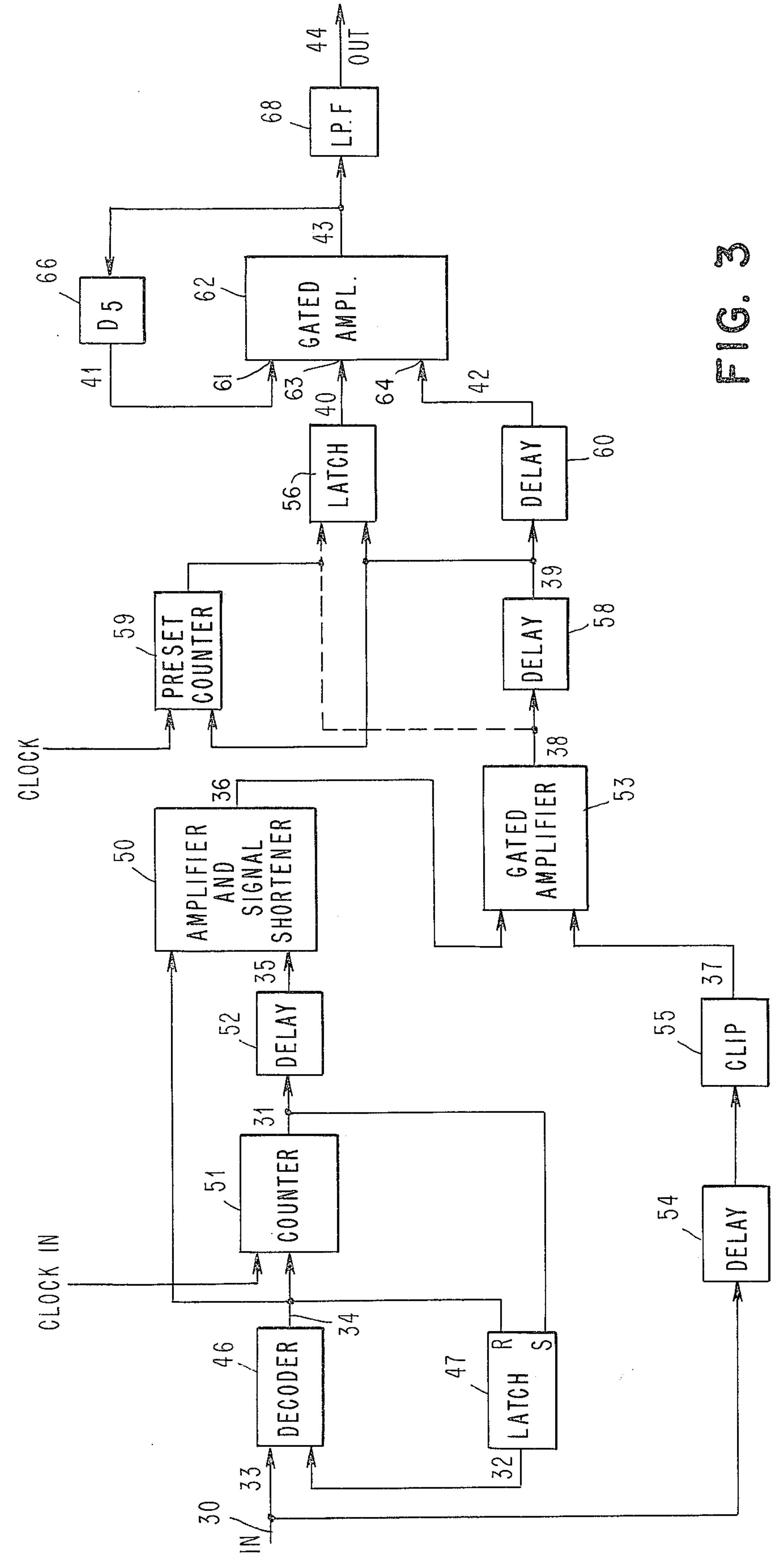
FIG. 3 is a schematic diagram showing the details of the automatic gain control system shown in block form in FIG. 1.
Figure 4:
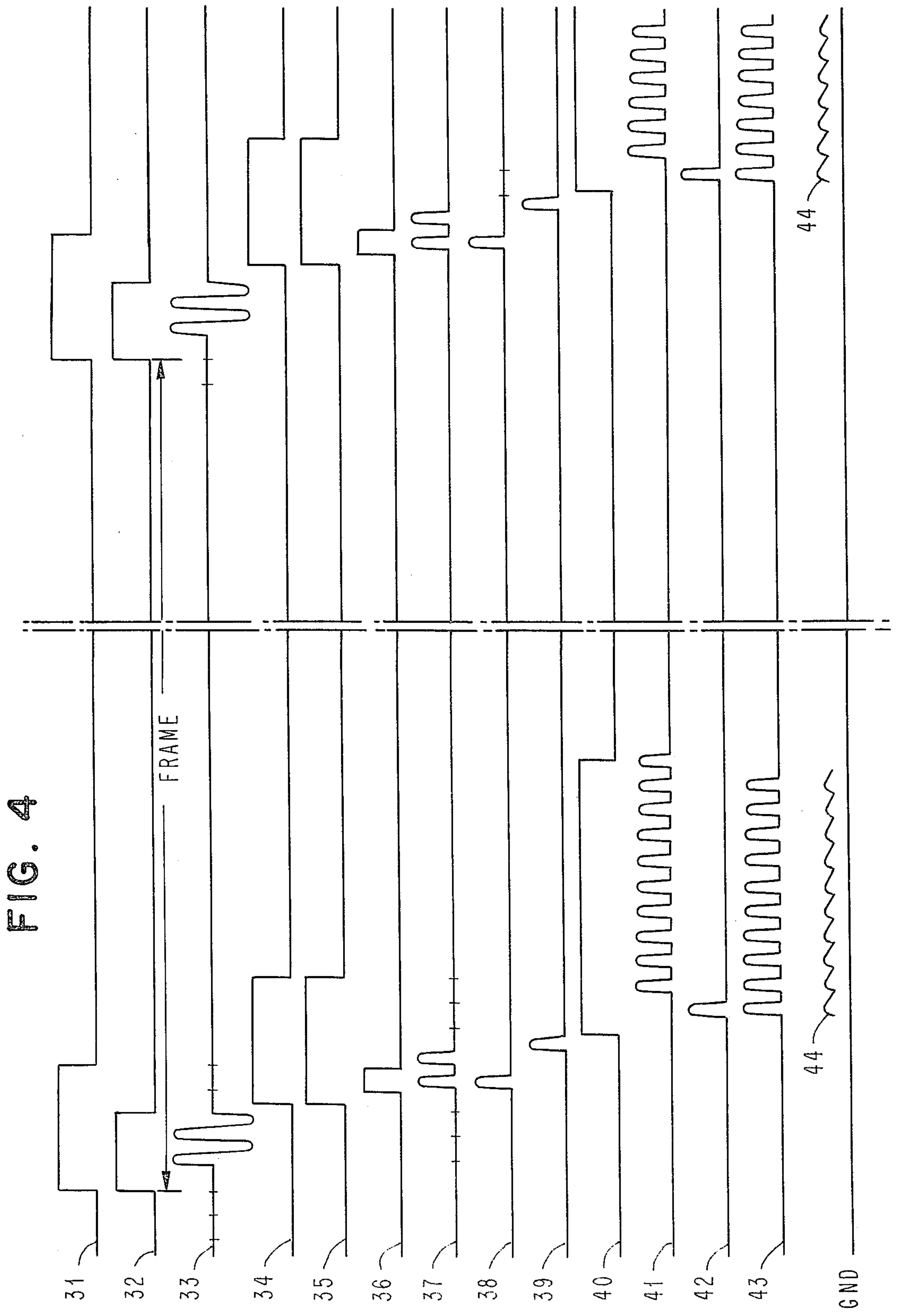
FIG. 4 is a schematic representation showing the waveforms generated in the automatic gain control system of FIG. 3.

Referring to FIGS. 3 and 4, there is shown the block diagram of the AGC system 18 and the various waveforms 31 through 43 which exist at the identified points therein. The input signals represented by waveform 33 are shown in FIG. 3 arriving at input terminal 30. This data input message is applied to the decoder 46 which recognizes the flag bits 0,1,1 and produces an output pulse 34 which is equivalent in time duration to the three flag bits of waveform 33. The latch 47 is arranged to provide an output pulse 32 to the decoder 46 which gates the decoder 46 on for the length of time of duration and at the time of arrival of the flag bits. The output pulse 34 of the decoder 46 is utilized to reset the latch 47 thereby removing the gate input 32 to the decoder 46 so that the decoder is off until it is again gated at the time of arrival of the flag bits of the next frame. The output pulse 34 from the decoder 46 is also applied to an amplifier and signal shortener 50. This same signal 34 is applied to counter 51 which is arranged to count the number of bits in a frame less the number of bits in the flag bits. In the preferred embodiment being discussed, the frame length is 64 bits minus the 3 bit flag pulse the initiating pulse leaving 61 bits to be counted. When the counter 51 has reached the final count, an output pulse 31 is produced which sets the latch 47 to produce the previously mentioned gating pulse 32 for the decoder 46. The counter 51 output pulse 31 is also applied to a delay circuit 52 which provides a delay of 3 bits so that the output signal 35 of the delay which is applied to the amplifier and signal shortener circuit 50 arrives at the same time as the output pulse 34 from the decoder 46. It will be appreciated that the output pulse 34 from the decoder 46 is generated as a result of the 3 flag bits from the beginning of a frame and pulse 35 is generated by delaying the pulse 31 generated during the previous frame. Accordingly, this decoder output pulse 34 and the 3 bit delayed pulse 35 should be coincident in their arrival at the amplifier and signal shortener circuit 50. The amplifier and signal shortener 50 produce a slightly amplified and much shortened pulse output 36 as a result of the coincidence of pulses 34 and 35. This shortened pulse 36 is applied to the gated amplifier 53. The input to the AGC system at terminal 30 is also applied to a delay 54. The delay 54 delays the input waveform 33 a time equal to the time the pulses take to pass through the decoder, then pass through the amplifiersignal shortener 50 and appear at the input to the gated amplifier 53. The pulse 36 generated at the output of the amplifier-signal shortener 50 is shown as waveform 36, FIG. 4. The delayed output from delay 54 is fed to a clipper 55 where the lower half of the data waveform is removed as is shown in waveform 37 of FIG. 4. The delay 54 is adjusted so that the positive half of the second bit of the flag bits, which is a 1 bit, will be coincident with pulse 36 at the input to the gated amplifier 53. If the desired coincidence occurs the gated amplifier generates an output pulse shown as waveform 38 in FIG. 4. The output of the gated amplifier 53 is the selected bit and in this case is the middle bit of the flag bits. Referring now to the various waveforms shown in FIG. 4 it can be seen that the counter output pulse 31 occurs as a result of the first frame of data. The latch output pulse 32 which gates the decoder also occurs at approximately the same time as the output counter pulse 31. The input waveform at terminal 30 and at the decoder 46 is represented by waveform 33 and can be seen to indicate the 0,1,1 flag bits of the next frame. Thus, the output pulse 34 from the decoder shown as the waveform 34 in FIG. 4 is generated as a result of the decoding of the flag bits and, therefore, is delayed by 3 bits with respect to the latch waveform 32. It should be appreciated that the waveform 35 is coincident with waveform 34. However, they are generated by the pulses in adjacent frames. The output waveform 36 which shows the shortened pulse generated as a result of the coincidence of the pulses in waveforms 34 and 35 also represents that the data in the adjacent frames is synchronized. The output waveform 38 at the output of the gated amplifier 53 represents the second bit of the (011) flag bits. The logic arrangement just described performs the selection function for one of the flag bits of each of the frames of data. If the frames of data are out of synchronization, the flag bit will not be selected.

The flag bit after selection is caused to repeat a number of times determined by a preset counter for each frame of data. The output pulse from the gated amplifier 53 shown as waveform 38 in FIG. 4 is applied to delay 58. The output of delay 58, waveform 39, sets latch 56 to its ON condition. The latch 56 is turned OFF by the pulse from the preset counter 59. The latch 56 is turned ON again by pulse 39 in the next frame.

The output of delay 58, waveform 39, also goes to preset counter 59 which starts the counter. The counter can be preset to any count but it has been found that a counter preset to count 10 clock inputs gives the best results in the present application of a 64 bit frame length. Of course, each clock pulse corresponds to 1 bit time in the 64 bit frame. Upon reaching the 10th count, preset counter 59 produces an output pulse which goes to the reset input of latch 56 causing it to shut off. In its off condition, latch 56 does not produce an output gate to gate the other inputs to gated amplifier 62.

The delayed pulse waveform 39 is sufficient to allow the latch 56 to reset to its initial ON state upon receipt of the pulse from delay 58 or counter 59. The output from delay 60, waveform 42, appears at input 64 to the gated amplifier 62. As can be seen from FIG. 3, the gated amplifier 62 has three inputs labelled 61, 63 and 64. Both of the inputs 61 and 64 are gated by latch 54 via input 63. When the latch 56 is in the ON state which consists of the first 10 frame pulses determined by counter 59, either input pulse 41 or 42 is gated at inputs 61 and 64, respectively, and will be passed through the gated amplifier 62. The signal appearing at the output of the gated amplifier 62, waveform 43, passes through delay 66 and passes back through the gated amplifier 62 as input waveform 41. This signal 41 will again pass through the gated amplifier 62 if the latch 56 is ON and will pass through delay 66 again. Thus, signal 41 circulates through the feedback path of the gated amplifier 62 a preset number of times (10) in accordance with the present counter 59 setting. The pulse is repetitively presented for the predetermined number of tiems (10) at the output of the gated amplifier as waveform 43. This waveform shows the output of the gated amplifier 62. These output pulses 43 from the gated amplifier 62 are connected as inputs to the low pass filter 68 which produces an output shown as waveform 44 which constitutes the DC input to the amplifier 16 to adjust the gain thereof.

Alternatively waveform 38 at the output of gated amplifier 53 can also be connected to latch 56 to reset the latch to its OFF condition. This connection is shown in dashed lines as an alternative. Waveform 39 following delay 58 is utilized to again turn latch 56 ON. Thus, the time that the latch is off is determined by delay 58. This delay is determined in accordance with the length of time it takes one of the input pulses to pass through the gated amplifier 62 and pass through the feedback path to the input of amplifier 62 as pulse waveform 41. Thus, the latch is OFF long enough to block one of the re-circulating pulses. When the latch is turned ON again a new re-circulating pulse is introduced at input 64. Accordingly, the pulse can be re-circulated for 63 bit times. This alternative works well only when the number of frame bits is small. The limiting factor is the amplifier 62.

In the invention the gated amplifier 62 has a gain less than 1 and it has been found that for a 63 bit circulation a 1% change in loop gain will result in a 15.9% change in the output DC value. The % variation in the output DC value for a given change in gain can be reduced by reducing the number of circulations of the selected pulse. It was found that 10 pulse circulations in a loop having a 1% change in loop gain produces an output having a 5.2% change in DC output. In this case, gated amplifier 53 was set to provide a gain of 2.39. By reducing the number of re-circulating pulses, the % change in output DC voltage can be significantly reduced for a given change in gain. The selection of 10 pulse circulations was made by presetting counter 59 to 10. After the 10 counts the output of the counter cuts off the latch, thereby limiting the re-circulation of 10 pulses as previously described.

While the invention has been particularly shown and described with reference to a preferred embodiment thereof, it will be understood by those skilled in the art that the various changes in form and detail may be made therein without departing from the spirit and scope of the invention.

What is claimed is:

1. In a transmission system which includes an automatic gain control system for an amplifier and wherein the data is transmitted in a non-DC derivable form in frames including one or more flag bits;

means for selecting one of said flag bits;

means for circulating said selected flag bit a predetermined number of times to provide a repetitive pulse output from said selected flag bit for the respective frame of data; and means for filtering said repetitive pulse output to obtain a substantially DC level indicative of the signal energy of the frame of data for application to the amplifier to accordingly adjust the gain thereof.

2. Apparatus according to claim 1, wherein said means for selecting one of said flag bits includes a decoder for generating a decoder pulse in response to said flag bits, said decoder pulse having a length corresponding to the number of bits forming said flag bits.

3. Apparatus according to claim 2, wherein said means for selecting one of said flag bits further includes a counter and a latch, said latch being reset to the OFF condition by said decoder pulse and said counter responding to said decoder pulse to start counting the number of counts equal to the number of pulses in a frame less the number of flag bits and generating a pulse upon said last count which sets the latch to the ON condition to produce a latch pulse energizing said decoder so that the input to said decoder can be decoded.

4. Apparatus according to claim 3, wherein said means for selecting one of said flag bits further includes a delay and signal shortener amplifier, said delay delaying the counter output signal a number of bit times equivalent to the number of flag bits and applying said delayed counter pulse to said signal shortener amplifier, said decoder pulse forming another input to said signal shortener amplifier, the output of said signal shortener amplifier being a pulse synchronized in time with a selected one of said flag bits.

5. Apparatus according to claim 4, wherein said means for selecting one of said flag bits further includes a delay, clipper, and gated amplifier, said delay delaying the input data a number of pulse times equivalent to the number of flag bits, said clipper clipping the negative portions of the delayed input data, said delayed and clipped input data forming one input to said gated amplifier and said output of said signal shortener amplifier forming the other input of said gated amplifier which when synchronized with said one input produces an output which is the selected bit of said flag bits.

6. Apparatus according to claim 1, wherein said means for circulating said selected flag bit a predetermined number of times includes a latch circuit, a preset counter and a latch delay;

said latch delay providing a delayed selected flag bit;

said latch circuit and said preset counter being turned ON simultaneously by said delayed selected flag bit, said preset counter producing a latch reset pulse following the last count for which the preset counter is set; and said latch reset pulse turning said latch circuit OFF so that said latch circuit produces a latch output gate pulse having a length determined by the count setting of said preset counter.

7. Apparatus according to claim 6, wherein said means for circulating said selected flag bit a predetermined number of times further includes a gated amplifier and feedback means from the output of said gated amplifier to the input thereof;

said feedback means including a feedback delay of one bit magnitude; a further selected flag bit delay means for delaying said selected flag bit until said latch is turned ON producing said latch output gate; and said delayed selected flag bit entering said gated amplifier and circulating through said feedback means until said latch is turned OFF removing said latch output gate.

8. Apparatus according to claim 1, wherein said means for filtering said repetitive pulse output comprises a low pass filter which generates a DC level output which is dependent on the number and amplitude of repetitive pulses.

* * * * *